United States Patent [19]

Isozaki et al.

[11] Patent Number: 4,904,504
[45] Date of Patent: Feb. 27, 1990

[54] METHOD OF PREVENTING ADHESION OF ORGANISMS

[75] Inventors: Osamu Isozaki, Yokohama; Naozumi Iwasawa, Hiratsuka, both of Japan

[73] Assignee: Kansai Paint Company, Limited, Amagasaki, Japan

[21] Appl. No.: 240,657

[22] Filed: Sep. 6, 1988

[30] Foreign Application Priority Data

Sep. 8, 1987 [JP] Japan .................. 62-224452

[51] Int. Cl.$^4$ ................................. B05D 3/02
[52] U.S. Cl. ..................... 427/387; 428/447; 528/23; 528/25
[58] Field of Search ............ 427/387; 528/23, 25; 428/447

[56] References Cited

U.S. PATENT DOCUMENTS 4,394,177  7/1983  Fujioka et al. ............. 106/287.16
4,405,679  9/1983  Fujioka et al. ............. 427/412.5
4,808,483  2/1989  Nakasuji et al. ............ 427/387 X Primary Examiner—Michael Lusignan
Attorney, Agent, or Firm—Armstrong, Nikaido, Marmelstein, Kubovcik & Murray

[57] ABSTRACT

Disclosed is a method of preventing adhesion of organisms characterized by coating a substrate with a coating composition comprising as its vehicle component a reaction product of a silane compound and/or a low condensation product thereof and an organic compound having at least two hydroxyl groups per molecule, the silane compound being represented by the formula

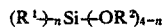

$(R^1)_n Si(OR^2)_{4-n}$ wherein $R^1$ is alkyl having 1 to 20 carbon atoms, haloalkyl having 1 to 12 carbon atoms, cycloalkyl having 3 to 7 carbon atoms, aryl or aralkyl having an alkyl portion with 1 to 12 carbon atoms, $R^2$ is a hydrogen atom, alkyl having 1 to 8 carbon atoms, cycloalkyl having 3 to 7 carbon atoms or haloalkyl having 1 to 8 carbon atoms and n is an integer of 0 to 3.

14 Claims, No Drawings

METHOD OF PREVENTING ADHESION OF ORGANISMS

The present invention relates to a novel method of preventing adhesion of organisms, and more particularly to a novel method of preventing adhesion of organisms on the surfaces of base materials or members of buildings, underwater structures and the like by applying a coating composition to the surfaces.

Numerous underwater organisms such as barnacles, ascidians, serpules, mussels, freshwater mussels, polyzor, green laver and laver live in the water of the sea, rivers, lakes, marshes or the like. When underwater structures such as harbor facilities, buoys, pipelines, bridges, submarine facilities, culture nets and fish trapping nets are installed in such a body of water, or ships navigate thereon, underwater organisms deposit and grow on the surface of the submerged portion and on other portions exposed to splashes of water causing harm or damage to the structure or ship. For example, underwater organisms, when deposited on the hull, offer increased friction resistance to water reducing the speed of navigation, necessitating an increased amount of fuel consumption to maintain the specified speed. This is an economical disadvantage. Further when underwater organisms become deposited on structures, such as harbor facilities, which are submerged or at the water surface, these structures encounter difficulties in serving their intended individual functions because the base material of the structure is likely to become corroded. Adhesion of underwater organisms on culture nets or fish trapping nets will clog the meshwork structure, possibly causing death to the catch.

To prevent underwater organisms from depositing and growing on underwater structures, it has been the practice to coat the structure with an antifouling coating composition comprising an organotin compound, cuprous oxide or like toxic antifouling agent. The adhesion and growth of underwater organisms can be reduced by the application of the coating compositions containing antifouling agents. However, use of a highly toxic antifouling agent is not desirable from the viewpoint of environmental safety and hygiene. Moreover, the toxic antifouling agent gradually dissolves out from the coating and is likely to cause water pollution over a long period of time, possible exerting an adverse influence on marine life.

In view of the above, it is desirable to provide a method of preventing adhesion of underwater organisms using a coating composition free from any toxic antifouling agent, possessing an outstanding antifouling effect (effect to prevent adhesion of underwater organisms on underwater structures) over a prolonged period of time, and assuring the human body of very high safety.

Further in a warm humid environment, fungi and like microorganisms grow on the inner and outer walls or like of buildings and other facilities producing various secretions, posing problems from the viewpoint of environmental hygiene and beauty. Further the adhesion and growth of such microorganisms impairs the appearance of the coating film and causes film deterioration or peeling. To prevent the adhesion of fungi and like microorganisms, it has been proposed to use fungicidal coating compositions comprising haloarylsulfonic, organotin, dithiocarbamate or like fungicidal agent. However, if the toxicity of these compositions are reduced such compositions are low in fungicidal effect, or if such compositions possess high toxicity to give an enhanced fungicidal effect they pose problems from the viewpoint of environmental hygiene. Thus, none of these compounds meet the two requirements and exhibit a sustained effect as desired.

The main object of the present invention is to overcome such problems heretofore experienced and to provide a method of effectively preventing adhesion of organisms such as underwater organisms, microorganisms and the like. The method achieves an outstanding antifouling effect and fungicidal effect and is free of environmental hygienic problems.

The invention provides a method of preventing adhesion of organisms characterized by coating a substrate with a coating composition comprising as its vehicle component a reaction product of a silane compound and/or a low condensation product thereof (hereinafter referred to merely as "silane compound") and an organic compound having at least two hydroxyl groups per molecule (hereinafter referred to merely as "hydroxyl-containing compound"), the silane compound being represented by the formula

$$(R^1)_n\text{—Si—}(OR^2)_{4-n} \quad (I)$$

wherein $R^1$ is alkyl having 1 to 20 carbon atoms, haloalkyl having 1 to 12 carbon atoms, cycloalkyl having 3 to 7 carbon atoms, aryl or aralkyl having an alkyl portion with 1 to 12 carbon atoms, $R^2$ is a hydrogen atom, alkyl having 1 to 8 carbon atoms, cycloalkyl having 3 to 7 carbon atoms or haloalkyl having 1 to 8 carbon atoms, and n is an integer of 0 to 3. The invention further provides a method of preventing adhesion of organisms characterized by coating a substrate with a coating composition comprising as its vehicle component a reaction product of a silane compound, a hydroxyl-containing compound and a monovalent phenolic compound.

The silane compound to be reacted with a hydroxyl-containing compound is a silane compound represented by the formula (I) and/or a low condensation product thereof and has at least one alkoxysilane group and/or at least one silanol group per molecule.

With reference to the formula (I), the alkyl groups represented by $R^1$ and $R^2$ are of the straight-chain or branched-chain type. $R^1$ is a $C_1$–$C_{20}$ alkyl group, and $R^2$ is a $C_1$ to $C_8$ alkyl group. The $C_1$–$C_{20}$ alkyl as $R^1$ and the $C_1$–$C_8$ alkyl as $R^2$ are selected, for example, from among methyl, ethyl, n-propyl, isopropyl, n-butyl, isobutyl, sec-butyl, tert-butyl, n-pentyl, isopentyl, tert-pentyl, neopentyl, n-hexyl, isohexyl, 1-methylpentyl, 2-methylpentyl, n-heptyl, 5-methylhexyl, n-octyl, n-nonyl, n-decyl, dodecyl, tridecyl, tetradecyl and the like. The alkyl as $R^1$ is preferably a $C_1$–$C_4$ alkyl. The haloalkyl represented by $R^1$ and $R^2$ is an alkyl groups wherein at least one of the hydrogen atoms is substituted with a halogen atom such as fluorine, chlorine or bromine atom. The haloalkyl group represented by $R^1$ has a carbon number of 1 to 12 and that by $R^2$ has a carbon number of 1 to 8. Examples of such groups are fluoropropyl, chloropropyl, fluorobutyl, trifluoropropyl and the like. Among these, $C_1$–$C_8$ fluoroalkyl groups are desirable. The cycloalkyl groups represented by $R^1$ are those having 3 to 7 carbon atoms and include, for example, cyclopropyl, cyclobutyl, cyclopentyl, cyclohexyl, cyclohexenyl and cycloheptyl. Cyclohexyl is especially preferable. The aryl represented by R¹ may be either monocyclic or polycyclic. Examples of preferred monocyclic aryl groups are phenyl, tolyl, xylyl and the like. Examples of preferable polycyclic aryl groups include naphthyl. The aralkyl represented by R¹ is a $C_1$-$C_{12}$ alkyl group substituted with the above-mentioned aryl. Examples of such aralkyl groups which are desirable are benzyl, phenethyl and the like.

Of the silane compounds represented by the formula (I), those wherein R² is alkyl or cycloalkyl are alkoxysilane compounds such as tetramethoxysilane, tetraethoxysilane, tetrapropoxysilane, tetrabutoxysilane, methyltrimethoxysilane, methyltriethoxysilane, methyltributoxysilane, ethyltributoxysilane, butyltrimethoxysilane, octyltrioctyloxysilane, phenyltrimethoxysilane, methyltrichloroethoxysilane, methyltrifluoroethoxysilane, fluoropropyltrimethoxysilane, benzyltriethoxysilane, cyclohexyltriethoxysilane, dimethyldiethoxysilane, diethyldiethoxysilane, diethyldipropoxysilane, dimethyldifluoroethoxysilane, dimethyldichloroethoxysilane, dimethyldibutoxysilane, diphenyldiethoxysilane, difluoropropyldimethoxysilane, dicyclohexyldicyclohexyloxysilane, trimethylmethoxysilane, trimethylethoxysilane, trimethylfluoroethoxysilane, trimethylchloroethoxysilane, trimethylbutoxysilane, triethylethoxysilane and the like. Of the silane compounds of the formula (I), those wherein R² is a hydrogen atom are silanol compounds, such as diphenyldisilanol, phenylmethyldisilanol, dimethyldisilanol and the like. Preferable among the silane compounds represented by the foregoing formula are those wherein R¹ is $C_1$-$C_4$ lower alkyl or phenyl, R² is $C_1$-$C_4$ lower alkyl such as methyl, ethyl or propyl, and n is 0 or 1. Examples of such compounds are tetramethoxysilane, tetraethoxysilane, methyltrimethoxysilane, methyltriethoxysilane, methyltripropoxysilane, phenyltrimethoxysilane, phenyltriethoxysilane and the like. Also usable is a low condensation product of up to about 10000, preferably about 200 to 3000, in number average molecular weight and obtained by condensing one or at least two silane compounds represented by the formula (I).

The hydroxyl-containing compound to be reacted with the silane compound is an organic compound having, in the molecule, at least two hydroxyl groups reactive with the alkoxyl or silanol group of the silane compound. When the coating is formed by the coating composition of the present invention, the reaction product of the hydroxyl-containing compound and the silane compound in the coating is hydrolyzed with the water in the atmosphere by water such as rainwater, seawater or the water of rivers or lakes, permitting the hydroxyl-containing compound in the coating to dissolve or disperse in the water (so-called self-polishing property) to thereby prevent organisms from adhering to the surface of the coating.

Examples of useful hydroxyl-containing compounds are polyhydric alcohols such as ethylene glycol, propylene glycol, butylene glycol, neopentyl glycol, hexylene glycol, pentanediol, hexanediol, heptanediol, 2-ethyl-1,3-hexanediol, diethylene glycol, dipropylene glycol, triethylene glycol, tripropylene glycol, polyethylene glycol, polypropylene glycol, trimethylolethane, trimethylolpropane, glycerin, pentaerythritol, dipentaerythritol and polypentaerythritol; hydrogenated bisphenols such as

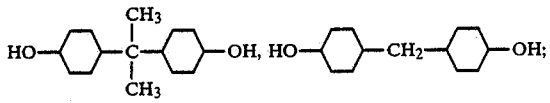

below-mentioned polyhydric phenols; and high-molecular weight organic compounds such as polyvinyl alcohol, hydroxyalkylcellulose, alkylcellulose, styrene-allyl alcohol copolymer, polyester, polyether, polyurethane, acrylic and modified epoxy resins having at least two hydroxyl groups in the molecule.

The polyhydric phenols usable as hydroxyl-containing compounds are those having at least two hydroxyl groups substituted with hydrogen atoms on the aromatic ring, i.e. at least two phenolic hydroxyl groups, in the molecule. More specific examples of such compounds are polyhydric phenolic compounds represented by the formula

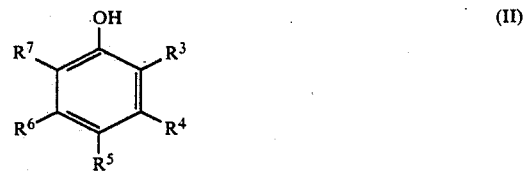

wherein $R^3$, $R^4$, $R^5$, $R^6$ and $R^7$ are each a hydrogen atom, halogen atom, hydroxyl, alkyl, alkoxyl, nitro, cyano or amino, at least one of $R^3$, $R^4$, $R^5$, $R^6$ and $R^7$ being hydroxyl, and polyhydric phenolic compounds represented by the formula

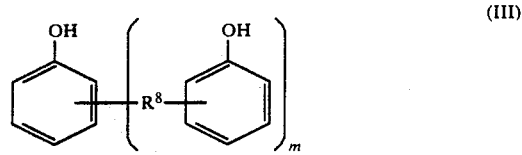

wherein the hydrogen atoms on the aromatic ring may be unsubstituted or substituted with a halogen atom, hydroxyl, alkyl, alkoxyl, nitro, cyano or amino, $R^8$ is alkylene, —O—, —$CH_2O$—, —$CH_2OCH_2$— or —$SO_2$—, and m is an integer of 1 to 10.

The halogen atom in the above formulae (II) and (III) is fluorine, chlorine, bromine or a like atom. The alkyl is preferably one having 1 to 8 carbon atoms and already mentioned as being exemplary of the alkyl represented by R² of the formula (I). Examples of preferred alkoxyl groups are those having 1 to 8 carbon atoms, such as methoxy, ethoxy, propoxy, butoxy, pentoxy and ocytyloxy. Examples of useful amino groups are —$NH_2$ and —$NH_2$ wherein one or both of the hydrogen atoms are substituted with alkyl having 1 to 9 carbon atoms, such as —$NHCH_3$, —$NHC_2H_5$, —$NHC_3H_7$, —$N(CH_3)_2$, —$N(C_2H_5)_2$, —$N(C_3H_7)_2$ and —$N(C_4H_9)_2$. The alkylene is represented by —$(C_qH_{2q})$— wherein q is preferably an integer of 1 to 5. Examplary of such groups are —$CH_2$—,

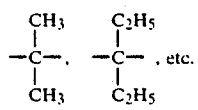

Examples of preferred compounds of the formula (II) are catechol, resorcin, hydroquinone, pyrogallol, hydroxyhydroquinone, fluoroglycine and the like. Examples of desirable compounds of the formula (III) are 2,2-bis(4-hydroxyphenyl)propane (bisphenol A), 2,2-bis(4-hydroxyphenyl)butane (bisphenol B), 1,1-bis(4-hydroxyphenyl)ethane, bis(4-hydroxyphenyl)methane (bisphenol F), 4-hydroxyphenyl ether, p-(4-hydroxyl)-phenol,

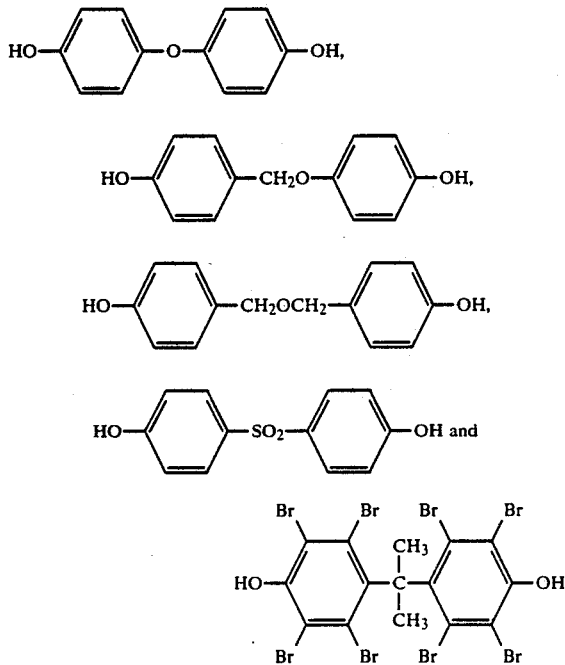

of these, bisphenol A and bisphenol F are desirable since these compounds give the resulting coating an improved and sustained effect to prevent adhesion of organisms.

The hydroxyl-containing compounds stated above are usable singly, or at least two of them can be used in combination. Of the hydroxyl-containing compounds, the high-molecular-weight compounds may have incorporated therein water-soluble groups other than hydroxyl (such as carboxyl, sulfonic acid group, phosphoric acid group, amino, amido and the like) so as to be more effectively soluble in water when so required.

Among the foregoing hydroxyl-containing compounds, preferable are di- to deca-hydric aliphatic alcohols, hydrogenated bisphenols, polyhydric phenols of the formulae (II) and (III) and like organic compounds. These compounds, when used, produce a higher effect to inhibit organisms or prevent adhesion thereof since these organic compounds hydrolyze with water to readily dissolve out from the surface of the coating formed. Especially when the polyhydric phenol is used as the sole hydroxyl-containing compound or as one of such compounds employed, the resulting coating exhibits a greatly improved antifouling effect and fungicidal effect since the coupling of the phenolic hydroxyl groups in the main skeleton with the silane compound is more susceptible to hydrolysis with water than the coupling of other hydroxyl groups, such as those of aliphatic compounds, with the silane compound and can therefore be broken more readily and further since the polyhydric phenol per se has bactericidal and fungicidal activities.

In reacting the silane compound with the hydroxyl-containing compound, the proportions of these compounds can be determined suitably in accordance with the performance required of the composition. Based on the combined amount of the two compounds, 5 to 95 wt. %, preferably 10 to 50 wt. %, of the silane compound, and 95 to 5 wt. %, preferably 90 to 50 wt. %, of the other compound are used.

The coating composition for use in the present method of preventing adhesion of organisms exhibits a further improved antifouling effect and improved effect to inhibit fungi when the vehicle component of the composition is prepared by reacting the silane compound, hydroxyl-containing compound and a monohydric phenolic compound. Such monohydric phenolic compounds include phenol and various substituted derivatives thereof. Exemplary of the substituted derivatives are phenols having 1 to 3 substituents selected from among lower alkyl having 1 to 6 carbon atoms, cycloalkyl having 3 to 7 carbon atoms, alkoxyl having 1 to 6 carbon atoms or phenyl, such as o-cresol, m-cresol, p-cresol, 2,3-xylenol, 2,4-xylenol, 2,5-xylenol, 2,6-xylenol, 3,4-xylenol, 3,5-xylenol, o-ethylphenol, m-ethylphenol, p-ethylphenol, p-tert-amylphenol, p-tert-butylphenol, p-phenylphenol, p-cyclohexylphenol and m-methoxyphenol; halogen-substituted phenols having 1 to 5 halogen atoms as substituents such as o-chlorophenol, p-chlorophenol, 2,4,6-trichlorophenol, pentachlorophenol and 2,4,6-tribromophenol; nitro-substituted phenols having 1 to 3 nitro groups as substituents such as o-nitrophenol, p-nitrophenol, 2,4-dinitrophenol and 2,4,6-trinitrophenol; amino-substituted phenols such as p-dimethylaminophenol; cyano-substituted phenols such as p-cyanophenol; and the like. Of these phenolic compounds, desirable are phenol, alkyl-substituted phenols having 1 to 3 lower alkyls having 1 to 6 carbon atoms, chlorine-substituted phenols having 1 to 5 chlorine atoms. Preferable examples are p-tert-butylphenol, o-, m- or p-cresol, chlorophenol, etc. These phenolic compounds are used singly, or at least two of them are used in combination. In the reaction of the monohydric phenolic compound, silane compound and hydroxyl-containing compound, the phenolic compound is used in an amount of about 5 to about 900 parts by weight per 100 parts by weight of the combined amount of the latter two compounds. The reaction of the monohydric phenolic compound in an amount in the above range results in a remarkably improved effect to prevent adhesion of organisms and to inhibit the growth organisms. Preferably, about 5 to about 800 parts by weight of the compound is used per 100 parts by weight of the combined amount of the silane compound and the hyroxyl-containing compound.

The silane compound is reacted with the hydroxyl-containing compound or with the hydroxyl-containing compound and the monohydric phenolic compound by heating the compounds at about 20° to 300° C., preferably about 60° to about 200° C. in the presence of a catalyst while removing the by-product (water, alcohol or the like). When required, these compounds are used as dissolved or dispersed in an inert organic solvent. The reaction is completed in about 1 to about 20 hours, usually in about 1 to about 8 hours. Examples of useful inert organic solvents are those which are not reactive with the silane compound, hydroxyl-containing compound or phenolic compound, such as butyl acetate, amyl acetate, methyl acetoacetate, acetic acid ethylene glycol monomethyl ether and like ester solvents, cyclohexanone, methyl butyl ketone, methyl amyl ketone and like ketone solvents, toluene, xylene and like aromatic hydrocarbon solvents, etc. Examples of useful catalysts are inorganic acids such as hydrochloric acid, sulfuric acid, nitric acid and phosphoric acid; organic acids such as formic acid, acetic acid, p-toluenesulfonic acid and phenylphosphonic acid; Lewis acids such as iron chloride, aluminum chloride and boron fluoride; metal alkoxides such as isopropylate aluminum, butylate aluminum, monobutylate diisopropylate aluminum, tetraisopropyl titanate, tetrabutyl titanate, tetraoctyl titanate, tetramethyl zirconate and tetrabutyl zirconate; metal chelate compounds such as ethyl acetoacetate aluminum diisopropylate, aluminum tris(acetylacetonate), aluminum tris(ethylacetoacetate), tetrakis-(acetylacetone)zirconium, tetrakis(propylacetoacetate)zirconium and dipropoxybis(acetylacetone)titanate; and the like. These catalysts are used in an amount of about 0.01 to about 10 parts by weight per 100 parts by weight of the combined amount of the reactants, i.e. the silane compound and the hydroxyl-containing compound, or these compounds and the monohydric phenolic compound.

The reaction product thus obtained is preferably about 1000 to about 100000, more preferably about 3000 to about 40000, in number average molecular weight.

The coating composition of the invention can be prepared by a known method using the reaction product as its vehicle component. For example, the required pigment and other components are admixed with or dispersed in the reaction mixture as obtained in the form of an organic solvent solution or as diluted with a suitable solvent, whereby a composition is prepared for use in the present method of preventing adhesion of organisms. The organic solvent to be used is not limited specifically insofar as the reaction mixture is soluble or dispersible therein. Examples of useful solvents are alcohol, ketone, ester, aromatic hydrocarbon and like solvents. Examples of useful pigments are titanium oxide, carbon black, red iron oxide, chrome yellow, Cyanine Blue, Cynquasia Red, Quinacridone Red, Fast Red, Cyanine Green, Chrome Green and like coloring pigments, and talc, calcium carbonate, mica, clay, siliceous sand and like extender pigments. The coating composition for use in the present invention has incorporated therein such pigments usually in an amount of up to 300 parts by weight per 100 parts by weight of the vehicle component calculated as solids.

Other components which can be incorporated into the coating composition when required include, for example, resin, antifouling agent, plasticizer, coating surface adjusting agent, pigment dispersant, etc. Examples of useful resins are those generally used for coating compositions, such as epoxy, polyester, alkyd, acrylic, urethane, phenolic and like resins. These resins are used usually in an amount of up to 100 parts by weight per 100 parts by weight of the vehicle component solids.

The method of the present invention is practiced by applying the coating composition to the base materials or members of buildings, underwater structures, etc. which need to be protected against the adhesion of organisms. More specifically, the coating composition is useful as an interior finishing material for use in houses and related facilities, and also in hospitals, breweries, food plants (e.g. bakeries), pharmaceutical manufacturing industry, electronic device manufacturing plants, etc. which must be biologically clean so as to protect the environment from microorganisms. The composition is also useful for coating underwater structures (such as ships, harbor facilities, buoys, pipelines, bridges, submarine facilities, culture netting, fish trapping netting, etc.) to prevent underwater organisms from adhesion and growing on the structure. When applied to underwater structures, the composition forms coatings which exhibit an outstanding antifouling effect over a prolonged period and have high safety for the human body. When the composition is to be applied to the underwater structure, it is generally desirable to coat the structure with a corrosion inhibitory undercoat composition of the rubber chloride type and thereafter coat the resulting coating with the present composition.

The coating composition can be applied to the surface of the substrate, for example, by brush coating, spray coating, roller coating or dipping. The composition is applied usually in an amount of 5 to 400 g/m$^2$ although the amount is not limited specifically. Although the coating can be dried at room temperature, it can be dried by heating at a temperature of up to about 200° C. when so required.

The coating composition of the invention which comprises the reaction product of a silane compound and a hydroxyl-containing compound as its vehicle component forms a coating which has

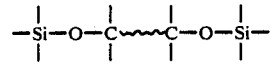

coupling as its main skeleton. When the coating is formed, the reaction product is hydrolyzed with the moisture or water in air, rainwater, seawater or like water to easily cut off the

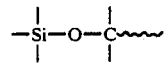

coupling portion, permitting the hydroxyl-containing compound to dissolve out gradually from the surface of the coating. Consequently, the surface of the coating is protected from occurrence or adhesion of organisms and microorganisms to exhibit an excellent antifouling effect and effect to inhibit fungi over a prolonged period of time.

When the coating composition comprises the reaction product of a silane compound, hydroxyl-containing compound and monohydric phenolic compound as its vehicle component, the composition forms a coating wherein the monohydric phenolic compound is coupled to the silane. Because the coupled monohydric phenolic compound has high bactericidal and fungicidal activities and further because the coating has

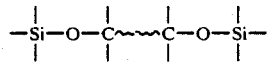

coupling as the main skeleton, the coating acts effectively as stated above, exhibiting an outstanding antifouling effect and effect to inhibit fungi over a long period of time.

The present invention will be described in greater detail with reference to the following preparation examples, examples and comparative examples, in which the parts and percentages are all by weight.

PREPARATION EXAMPLE 1

| Tetramethoxysilane | 152 parts |
| Bisphenol A | 342 parts |
| p-toluenesulfonic acid | 5 parts |

The above ingredients were mixed together and reacted at 100° to 200° C. for 10 hours while controlling the rate of distillation of the resulting methanol. The reaction was completed when the theoretical amount of methanol was distilled off. The reaction product obtained was then diluted with xylene to prepare a transparent liquid having a nonvolatile content of 50%. The reaction product was 5800 in number average molecular weight.

PREPARATION EXAMPLE 2

| Methyltriethoxysilane | 178 parts |
| Bisphenol A | 228 parts |
| Phenol | 94 parts |
| Trisacetylacetonate aluminum | 1 part |

The above ingredients were mixed together and reacted at 100° to 200° C. for 10 hours. The reaction was completed when the theoretical amount of ethanol was distilled off. The reaction product obtained was then diluted with toluene to prepare a transparent liquid having a nonvolatile content of 50%. The reaction product was 10000 in number average molecular weight.

PREPARATION EXAMPLE 3

| Phenyltrimethoxysilane | 198 parts |
| Bisphenol A | 228 parts |
| p-tert-Butylphenol | 150 parts |
| Tetrabutyl titanate | 3 parts |

The above ingredients were mixed together and reacted at 100° to 200° C. for 15 hours. The reaction was completed when the theoretical amount of methanol was distilled off. The resulting reaction product was then diluted with xylene to obtain a transparent liquid having a nonvolatile content of 50%. The reaction product was 15000 in number average molecular weight.

PREPARATION EXAMPLE 4

| Phenyltrimethoxysilane | 198 parts |
| Hydrogenated bisphenol A | 360 parts |
| Trisacetylacetonate aluminum | 1 part |

These ingredients were mixed together and reacted at 100° to 200° C. for 10 hours. The reaction was terminated when the theoretical amount of methanol was distilled off. The resulting reaction product was then diluted with xylene to obtain a transparent liquid having a nonvolatile content of 50%. The reaction product was 20000 in number average molecular weight.

PREPARATION EXAMPLE 5

| Tetramethoxysilane | 136 parts |
| Neopentyl glycol | 60 parts |
| Benzyl alcohol | 30 parts |
| Isopropylate aluminum | 1 part |

These ingredients were mixed together and reacted at 100° to 200° C. for 5 hours. The reaction was terminated when the theoretical amount of methanol was distilled off. The resulting reaction product was then diluted with xylene to obtain a transparent liquid having a nonvolatile content of 50%. The reaction product was 5000 in number average molecular weight.

PREPARATION EXAMPLE 6

| Methyltrimethoxysilane | 136 parts |
| Diethylene glycol | 100 parts |
| Pentachlorophenol | 65 parts |
| Butylate aluminum | 0.5 parts |

These ingredients were mixed together and reacted at 100° to 200° C. for 5 hours. The reaction was terminated when the theoretical amount of methanol was distilled off. The resulting reaction product was then diluted with toluene to obtain a transparent liquid having a nonvolatile content of 50%. The reaction product was 10000 in number average molecular weight.

EXAMPLES 1-6

Slate panels coated with "Vinyl Deluxe 200," (brand name for acrylic emulsion coating composition manufactured by Kansai Paint Co., Ltd., Japan) and fishing nets were coated to a dry thickness of 5 to 10 micrometers and 10 micrometers, respectively, with each of the transparent liquids having a nonvolatile content of 50% and prepared in Preparation Examples 1 to 6, and dried at room temperature for 2 days to form coatings. The Example numbers correspond to the Preparation Example numbers, respectively. The coatings were tested for antifouling effect and fungicidal effect with the results given in Table 1.

Comparative Examples 1 and 2

Antifouling and fungicidal tests were conducted in the same manner as in Example 1 using an antifouling coating composition (Comparative Example 1) comprising 10 parts of "Pliolite S-5" (styrene-butadiene copolymer, product of Goodyear Tire & Rubber Co.), 10 parts of rosin, 5 parts of "Adekacizer E450" (chlorinated n-paraffin, product of Adeka Argus Co., Ltd.) and 15 parts of cuprous oxide, or an fungicidal coating composition (Comparative Example 2) prepared by admixing 0.5% of "Nopococide N-96" (tetrachloroisophthalonitrile, product of San Nopco Co., Ltd.) with "Vinyl Deluxe 200" (shown before). Table 1 shows the results.

The tests were conducted by the following methods.

Fungicidal test:

Conducted according to JIS Z 2911. The following three kinds of fungi were used for testing.
A: Exposure to a mixture of three fungi, i.e.
Aspergillus niger, Penicillium citrinum and Cladosporium cladosporioides.
B: Exposure to Alternaria sp.
C: Exposure to Fusarium sp.

The results were evaluated according to the following criteria.

—: No growth of fungi on the surface of the specimen.
+: Growth of fungi over less than one-third the area of the specimen surface.
++: Growth of fungi cover one-third to two-thirds the area of the specimen surface.
+++: Growth of over more than two-thirds the area of the specimen surface.

Antifouling test:

The fishing net was held immersed in seawater as suspended from a raft in Toba bay, Mie Prefecture, Japan for 1 month and 3 months, and the area of the net having organisms deposited thereon was measured. The area is expressed in percentage.

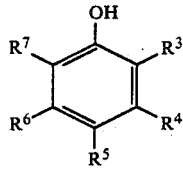

wherein $R^3$, $R^4$, $R^5$, $R^6$ and $R^7$ are each a hydrogen atom, halogen atom, hydroxyl, alkyl, alkoxyl, nitro, cyano or amino, at least one of $R^3$, $R^4$, $R^5$, $R^6$ and $R^7$ being hydroxyl, and polyhydric phenolic compounds represented by the formula

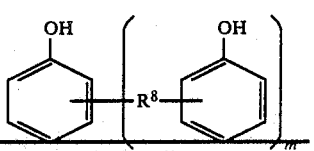

TABLE 1

| | Fungicidal effect | | | | | | Antifouling effect | | | |
| | A | | B | | C | | Barnacles | | Green layer | |
| | 3 Days | 10 days | 3 Days | 10 Days | 3 Days | 10 Days | 1 Month | 3 Months | 1 Month | 3 Months |
| Example | | | | | | | | | | |
| 1 | ++ | +++ | + | ++ | + | + | 0 | 10 | 0 | 15 |
| 2 | + | ++ | — | + | — | + | 0 | 0 | 0 | 5 |
| 3 | + | ++ | + | ++ | + | ++ | 0 | 0 | 0 | 5 |
| 4 | ++ | +++ | + | ++ | + | + | 0 | 10 | 0 | 20 |
| 5 | ++ | +++ | + | + | + | ++ | 5 | 15 | 10 | 25 |
| 6 | — | + | — | — | — | — | 0 | 0 | 0 | 5 |
| Comp. Ex. | | | | | | | | | | |
| 1 | +++ | +++ | ++ | +++ | ++ | +++ | 5 | 15 | 10 | 30 |
| 2 | ++ | +++ | ++ | ++ | ++ | +++ | 30 | 50 | 40 | 80 |

We claim:

1. A method of preventing adhesion of organisms to a substrate comprising coating the substrate with a coating composition consisting essentially of, as its vehicle component, a reaction product of 5 to 95 wt.% of a silane compound and/or a low condensation product thereof having a number average molecular weight of up to about 10,000 and 95 to 5 wt% of an organic compound having at least two hydroxyl groups per molecule, the silane compound being represented by the formula

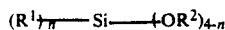

wherein $R^1$ is an alkyl having 1 to 20 carbon atoms, haloalkyl having 1 to 12 carbon atoms, cycloalkyl having 3 to 7 carbon atoms, aryl or aralkyl having an alkyl portion with 1 to 12 carbon atoms, $R^2$ is a hydrogen atom, alkyl having 1 to 8 carbon atoms, cycloalkyl having 3 to 7 carbon atoms or haloalkyl having 1 to 8 carbon atoms and n is an integer of 0 to 3.

2. A method as defined in claim 1 wherein $R^1$ is a lower alkyl having 1 to 4 carbon atoms or phenyl, $R^2$ is lower alkyl having 1 to 4 carbon atoms and n is 0 or 1.

3. A method as defined in claim 1 wherein the hydroxyl-containing organic compound is at least one compound selected from among di- to deca-hydric aliphatic alcohols, hydrogenated bisphenols and polyhydric phenols having the following formula (A) or (B)

wherein the hydrogen atoms on the aromatic ring may be unsubstituted or substituted with a halogen atom, hydroxyl, alkyl, alkoxyl, nitro, cyano or amino, $R^8$ is alkylene, —O—, —CH$_2$O—, —CH$_2$OCH$_2$— or —SO$_2$—, and m is an integer of 1 to 10.

4. A method as defined in claim 3 wherein the hydroxyl-containing organic compound is at least one polyhydric phenol represented by the formula (A) or (B).

5. A method as defined in claim 4 wherein the hydroxyl-containing organic compound is at least one polyhydric phenol represented by the formula (B).

6. A method as defined in claim 5 wherein the polyhydric phenol is at least one of bisphenol A and bisphenol F.

7. A method as defined in claim 1 wherein the hydroxyl-containing organic compound is reacted with the silane compound and/or the condensation product thereof in a ratio of 90 to 50 wt.% of the former to 10 to 50 wt.% of the latter based on the combined amount of the reactants.

8. A method as defined in claim 7 wherein 90 to 50 wt.% of the hydroxyl-containing organic compound is reacted with 10 to 50 wt.% of the silane compound and/or the condensation product thereof.

9. A method as defined in claim 1 wherein the reaction product is in the range of about 1000 to about 100000 in number average molecular weight.

10. A method as defined in claim 9 wherein the reaction product is in the range of about 3000 to about 40000 in number average molecular weight.

11. A method of preventing adhesion of organisms to a substrate comprising coating the substrate with a coating composition consisting essentially of, as its vehicle component, a reaction product of a silane compound and/or a low condensation product thereof having a number average molecular weight of up to about 10,000, an organic compound having at least two hydroxyl groups per molecule and a monohydric phenolic compound, the silane compound being represented by the formula

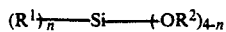

wherein $R^1$ is alkyl having 1 to 20 carbon atoms, haloalkyl having 1 to 12 carbon atoms, cycloalkyl having 3 to 7 carbon atoms, aryl or aralkyl having an alkyl portion with 1 to 12 carbon atoms, $R^2$ is a hydrogen atom, alkyl having 1 to 8 carbon atoms, cycloalkyl having 3 to 7 carbon atoms or haloalkyl having 1 to 8 carbon atoms and n is an integer of 0 to 3, the weight ratio of the silane compound and low condensation product thereof to the hydroxyl-containing organic compound being 5 to 95 wt% of the former and 95 to 5 wt.% of the latter, the monohydric phenolic compound being used in an amount of about 5 to about 900 parts by weight per 100 parts by weight of the combined amount of the silane compound and/or low condensation product thereof and the hydroxyl-containing organic compound.

12. A method as defined in claim 11 wherein the monohydric phenolic compound is at least one compound selected from the group consisting of phenol and phenol substituted with lower alkyl having 1 to 6 carbon atoms, cycloalkyl having 3 to 7 carbon atoms, alkoxyl having 1 to 6 carbon atoms, halogen atoms, nitro, amino and/or cyano.

13. A method as defined in claim 12 wherein the phenolic compound is at least one compound selected from the group consisting of phenol, alkyl-substituted phenol having 1 to 3 lower alkyls having 1 to 6 carbon atoms and chlorine-substituted phenol having 1 to 5 chlorine atoms.

14. A method as defined in claim 13 wherein the phenolic compound is a compound selected from the group consisting of phenol, cresol, p-tert-butylphenol and chlorophenol.

* * * * *